Feb. 9, 1943.  B. G. BROWN  2,310,510
AIR CLEANER AND SILENCER ASSEMBLY
Filed July 17, 1940
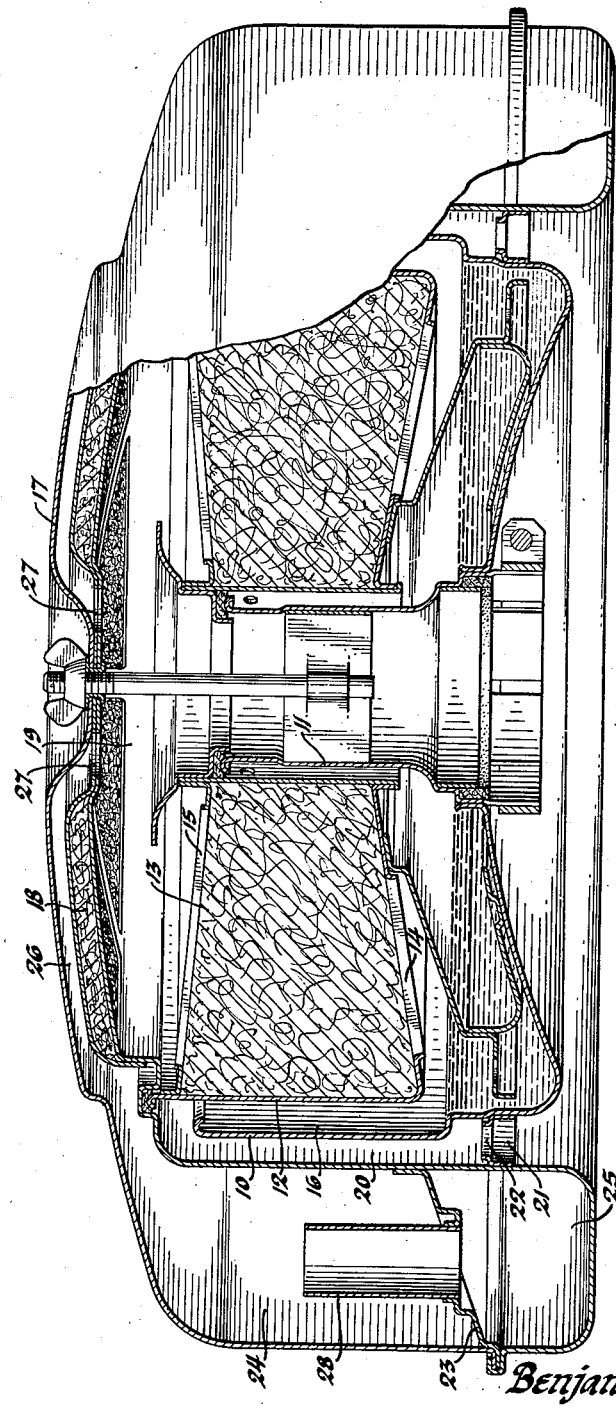
Inventor
Benjamin Gratz Brown
By
Blackmore, Spencer & Flint
Attorneys Patented Feb. 9, 1943

2,310,510

UNITED STATES PATENT OFFICE 2,310,510

AIR CLEANER AND SILENCER ASSEMBLY

Benjamin Gratz Brown, Flint, Mich., assignor to General Motors Corporation, Detroit, Mich., a corporation of Delaware Application July 17, 1940, Serial No. 346,046

3 Claims. (Cl. 183—15)

This invention has to do with air cleaner and silencer assemblies in which the silencer encircles the air cleaner and has for its principal object to provide an assembly of this type in which may be incorporated without substantial alteration an air cleaner of conventional design and economies in manufacture thus effected.

For a better understanding of the nature and objects of this invention, reference is made to the following specification wherein is described the preferred embodiment of the invention which is illustrated in the accompanying drawing.

The single figure of the accompanying drawing is a view, largely in vertical section but partly in side elevation, of a liquid-bath type air cleaner and resonator silencer assembly in accordance with my invention.

The basis of the assembly shown in the drawing is a liquid-bath type air cleaner of what has been called the "hat" type. It includes a bowl-like member 10 with an orifice in the center of its bottom in which there is secured a tube 11 which extends well up into the bowl-like member. The tube 11 defines with the bowl-like member an annular reservoir which is filled with oil or some other suitable liquid to about the level indicated in the drawing before the assembly is put into use. The tube 11 is encircled by an annular filter which consists of a shell 12 filled with a suitable air filtering medium 13 which is wetted with the liquid which the annular reservoir contains. The inner and outer walls of the filter element are basically imperforate but there are in its lower and upper walls air inlet and outlet orifices 14 and 15. The filter is supported from the upper end of the tube 11 with its lower wall above the level of the liquid in the annular reservoir and its outer side wall spaced radially from the side wall of the bowl-like member so as to leave therebetween an annular passage 16 from which air may enter the inlet orifice 14 in the filter.

The resonator silencer is incorporated in the assembly by substituting for a cover of the kind ordinarily found on liquid-bath air cleaners of the "hat" type a member which is designated in the drawing by the reference character 17.

The member 17 is shaped generally like an inverted double-walled bowl and is assembled with the body 10—11 and filter 12—13 of the air cleaner with its inner end wall which is lined with a pad 18 of sound absorbing material seated on the outer edge of the filter. The member 17 closes the upper ends of the filter 12—13 and tube 11 of the body 10—11 of the air cleaner to the atmosphere but its inner end wall is spaced from the tube and from the filter except at its outer edge to define a passage 19 through which air may pass from the outlet orifice 15 in the filter into the upper end of the tube. The inner side wall of the member 17 is made sufficiently larger in diameter than the outer side wall of the body 10—11 of the air cleaner to leave therebetween when the member is assembled with the body and filter of the air cleaner an annular passage 20 through which air may pass from the atmosphere into the upper end of the passage 16. The lower end of the passage 20 is bridged by a ring 21 which is secured to the outer side wall of the body 10—11 of the air cleaner and around which the inner side wall of the member 17 telescopes snugly. The ring 21 keeps the inner side wall of the member 17 spaced uniformly from the outer side wall of the body 10—11 of the air cleaner throughout its circumference and has in it openings 22 through which air may pass.

The sound wave attenuating compartment defined by the walls of the member 17 is divided by a partition 23 which bridges its inner and outer side walls into primary and secondary resonance chambers 24 and 25. The primary resonance chamber 24 communicates with the passage 19 through which air passes from the outlet orifice 15 in the filter into the upper end of the tube 11 through the aperture 26 between the inner and outer walls of the member 17 and orifices 27 in the inner end wall of the member 17 above the tube 11. The secondary resonance chamber 25 is connected to the primary resonance chamber 24 by a tube 28 which extends through the partition 23.

The assembly shown in the drawing was designed for installation on an internal combustion engine with the lower end of the tube 11 connected to the air intake tube of its carburetor. When the assembly is so installed and the engine is operating, the suction created by the pistons of the engine on their suction strokes draws air into the passage 20 and, through it, the passage 16, the filter 12—13, the passage 19 and the tube 11, into the carburetor and cylinders of the engine. In the course of its passage through the assembly the air will, of course, be freed of foreign matter by the air cleaner. The resonator which consists of the resonance chambers 24 and 25, the tube 28, the aperture 26 and the orifices 27, which will, of course, be so tuned that it responds to and attenuates by resonance preselected objectionable sound waves in the intake noises of the engine on which the assembly is installed, will, in conjunction with the pad 18 of sound absorbing material, eliminate the intake noises of the engine. The assembly shown in the drawing consequently represents a compact, particularly in the matter of height, and efficacious means of silencing the intake noises of an internal combustion engine and removing foreign matter from the combustion supporting air required by it.

I claim:

1. In an air cleaner and silencer assembly, a bowl-like member, a tubular member which opens through the bottom of the bowl-like member and with it defines an annular liquid reservoir, an annular filter member with orifices in its lower and upper walls disposed within the bowl-like member with its outer side and lower walls spaced from the side wall and bottom of the bowl-like member to define a passage through which air may enter the orifice in the lower wall of the filter member, a member which is shaped like an inverted bowl with double end and side walls which define a sound wave attenuating compartment, the inner end wall of the member which is shaped like an inverted bowl being seated on the outer edge of the filter member and constituting a wall of a passage through which air may travel from the orifice in the upper wall of the filter member into the upper end of the tubular member, the side walls of the member which is shaped like an inverted bowl encircling the side wall of the bowl-like member with the inner side wall of the former spaced from the side wall of the latter to define with it a passage through which air may travel from the atmosphere into the upper end of the passage defined by the side wall of the bowl-like member and the outer side wall of the filter member, and an orifice above the tubular member in the inner end wall of the member which is shaped like an inverted bowl through which the sound wave attenuating compartment communicates with the passage through which air travels from the orifice in the upper wall of the filter member into the upper end of the tubular member.

2. In an air cleaner and silencer assembly, a bowl-like member, a tubular member which opens through the bottom of the bowl-like member and with it defines an annular liquid reservoir, an annular filter member with air inlet and outlet orifices in it disposed within the bowl-like member with its outer side spaced from the side wall of the bowl-like member to define a passage through which air may enter the air inlet orifice in the filter member, a member which is shaped like an inverted bowl with double side walls which define a sound wave attenuating compartment, the end of the member which is shaped like an inverted bowl being seated on the outer edge of the filter member and constituting a wall of a passage through which air may travel from the air outlet orifice in the filter member into the upper end of the tubular member, the side walls of the member which is shaped like an inverted bowl encircling the side wall of the bowl-like member with the inner side wall of the former spaced from the side wall of the latter to define with it a passage through which air may travel from the atmosphere into the upper end of the passage defined by the side wall of the bowl-like member and the outer side wall of the filter member, and an orifice through which the sound wave attenuating compartment communicates with the passage through which air travels through the assembly.

3. In an air cleaner and silencer assembly, a member of bowl-like form, a filter member with air inlet and outlet orifices in it disposed within the member of bowl-like form with its outer side wall spaced from the side wall of the member of bowl-like form to define a passage through which air may enter the air inlet orifice in the filter member, a tubular member through which air leaves the assembly, another member of bowl-like form with double side walls which define a sound wave attenuating compartment, the end of the last-specified member of bowl-like form engaging the outer edge of the filter member and constituting a wall of a passage through which air may travel from the air outlet orifice in the filter member into the tubular member, the side walls of the last-specified member of bowl-like form encircling the side wall of the first-specified member of bowl-like form with the inner side wall of the former spaced from the side wall of the latter to define with it a passage through which air may travel from the atmosphere into the outer end of the passage defined by the side wall of the first-specified member of bowl-like form and the outer side wall of the filter member, and an orifice through which the sound wave attenuating compartment communicates with the passage through which air travels through the assembly.

BENJAMIN GRATZ BROWN.